US006874643B2

(12) United States Patent
Iwamoto (10) Patent No.: US 6,874,643 B2
(45) Date of Patent: Apr. 5, 2005

(54) SUCTION FILTER (75) Inventor: Takashi Iwamoto, Tokyo (JP)

(73) Assignee: Nifco Inc., Yokohama (JP)

( * ) Notice: Subject to any disclaimer, the term of this patent is extended or adjusted under 35 U.S.C. 154(b) by 128 days.

(21) Appl. No.: 10/241,657

(22) Filed: Sep. 12, 2002

(65) Prior Publication Data
US 2003/0057149 A1 Mar. 27, 2003

(30) Foreign Application Priority Data

Sep. 26, 2001 (JP) ........................................ 2001-293782
May 13, 2002 (JP) ........................................ 2002-136921

(51) Int. Cl.[7] ........................ B01D 29/33; B01D 35/027
(52) U.S. Cl. ........................ 210/461; 210/172; 210/486
(58) Field of Search ................................ 210/172, 356, 210/416.4, 457, 459, 461, 462, 483, 486, 487, 489, 493.2, 497.01, 497.3, 499; 55/370

(56) References Cited

U.S. PATENT DOCUMENTS 5,409,608 A * 4/1995 Yoshida et al. ............. 210/315
5,902,480 A * 5/1999 Chilton et al. .............. 210/317

FOREIGN PATENT DOCUMENTS

EP          542547 A1 * 5/1993    ......... B01D/35/027
JP          4-79962       7/1992

* cited by examiner

Primary Examiner—Matthew O. Savage
(74) Attorney, Agent, or Firm—Manabu Kanesaka (57) ABSTRACT In a suction filter, a synthetic resin upper plate 4 to be connected to a fuel inlet pipe is integrally molded with an upper filtering fabric 2, and a synthetic resin lower plate 5 is integrally molded with a lower filtering fabric. Two end portions of a spring are fixed to the upper and lower plates, and the peripheral portions of the upper and lower filtering fabrics are bonded together to obtain a filtering fabric bag. Thus, there is no such risk that the filtering fabric bag comes off the inlet pipe, the filtering fabric bag is worn out, and creases and poor bonding occur. Thus, the suction filter can be obtained with high reliability and good productivity.

11 Claims, 7 Drawing Sheets

SUCTION FILTER

BACKGROUND OF THE INVENTION AND RELATED ART STATEMENT

The invention relates to a suction filter to be attached to a tip portion of an inlet pipe for sucking fuel in a fuel tank and feeding the fuel to an engine or the like of an automobile to filter the fuel.

Figure 5:
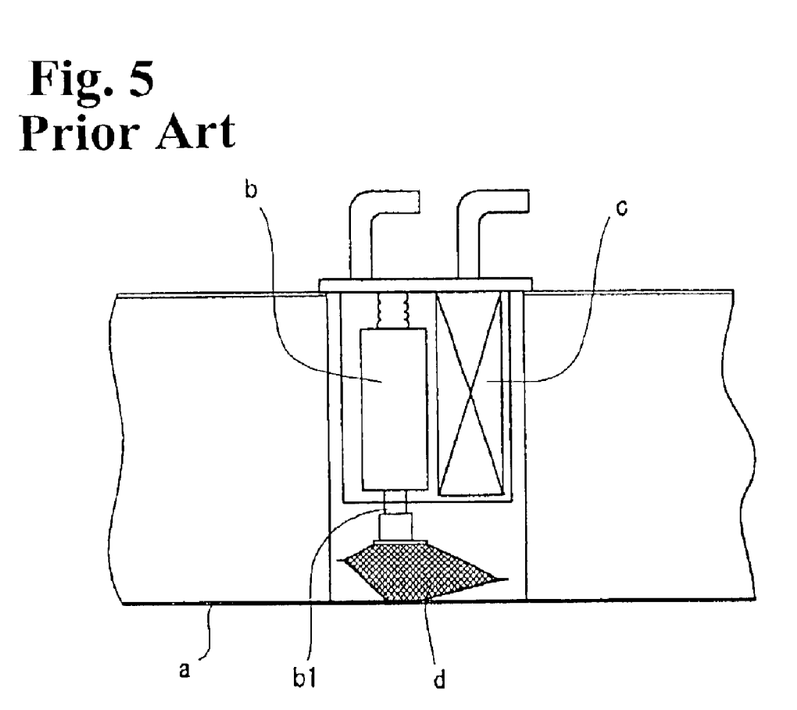
FIG. 5 is a schematic view showing a conventional structure in a fuel tank of an automobile.

As shown in FIG. 5, a pump b for feeding fuel in a fuel tank a to an engine is disposed in the fuel tank of an automobile, and the fuel is sucked through an inlet pipe b1 provided to the pump b and sent to the engine through a fuel filter c.

In this case, as shown in FIG. 5, a suction filter d is also attached to a tip portion of the inlet pipe b1 to remove relatively large impurities. The suction filter d is positioned to abut against a bottom surface of the fuel tank a.

Figure 4:
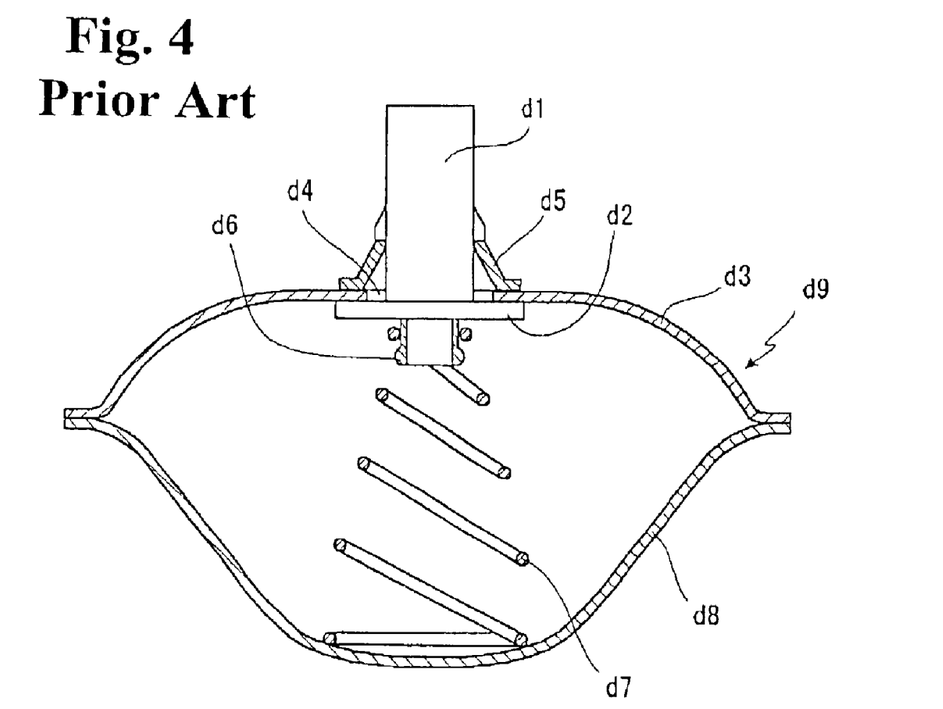
FIG. 4 is a sectional view showing a conventional suction filter.

Heretofore, a suction filter having a structure as shown in FIG. 4 has been known. More specifically, a brim-shape flange d2 is integrally formed at a lower end portion of a pipe portion d1 to be connected to the inlet pipe b1 of the pump b; the pipe portion d1 is inserted into a pipe attaching hole d4 provided to an upper filtering fabric d3; and a pressing clip d5 is attached to the pipe portion d1 so that peripheral portion of the pipe attaching hole d4 of the upper filtering fabric d3 is sandwiched between the upper flange d2 and the pressing clip d5 to attach the upper filtering fabric d3 to the tip portion of the pipe portion d1. Then, a conical shape coil spring d7 is attached to a spring attaching portion d6 projecting downward from a lower surface of the flange d2, and a lower filtering fabric d8 is provided to cover the coil spring d7. Thereafter, the peripheral portions of the lower filtering fabric d8 and the upper filtering fabric d3 are thermally bonded together to form a filtering fabric bag d9 at the tip portion of the pipe portion d1.

As shown in FIG. 5, the suction filter is attached to the tip portion of the inlet pipe b1 of the pump b located in the fuel tank a and the filtering fabric bag d9 is positioned to abut against the bottom surface of the fuel tank a. At this time, the filtering fabric bag d9 of the suction filter always has a specific size by the coil spring d7 provided therein, so that the filtering fabric bag d9 is not crushed to become flat, and also, the lower surface of the filtering fabric bag d9 always abuts against the bottom surface of the fuel tank a by the elasticity of the coil spring d7.

However, the conventional suction filter as shown in FIG. 4 has the following defects:

1. Since the upper filtering fabric d3 is sandwiched between the flange d2 and the clip d5 to fix the filtering fabric bag d9 to the pipe portion d1, the filtering fabric bag d9 is liable to be disconnected;

2. Since the lower surface of the filtering fabric bag d9 is directly pressed against the bottom of the fuel tank due to the resilient force of the coil spring d7, there is a risk that the lower surface of the filtering fabric bag d9 wears out; and 3. When the upper filtering fabric d3 and the lower filtering fabric d8 are thermally bonded together to form the filtering fabric bag d9, it is hard to accurately and firmly laminate the peripheral portions thereof and set them onto a thermal bonding machine due to the resilient force of the coil spring d7. Thus, creases and lines may be formed on the filtering fabric bag d9 and the peripheral portions of both filtering fabrics d3, d8 may not be thermally bonded together firmly.

In view of the above problems, the present invention has been made and an object of the invention is to provide a suction filter, wherein the above mentioned three problems can be solved, so that a highly reliable suction filter can be produced with good productivity.

Further objects and advantages of the invention will be apparent from the following description of the invention.

SUMMARY OF THE INVENTION

To attain the above objects, in a suction filter to be attached to a tip portion of a fuel inlet pipe disposed in a fuel tank, peripheral portions of an upper filtering fabric and a lower filtering fabric are bonded together to form a filtering fabric bag, and a spring is provided in the filtering fabric bag to prevent the filtering fabric bag from being crushed to become flat. A synthetic resin upper plate, to which the fuel inlet pipe is connected, is integrally molded with the upper filtering fabric, and, a synthetic resin lower plate is integrally molded at a specific position of the lower filtering fabric. Both end portions of the spring are fixed to the upper and lower plates, respectively.

In other words, in the suction filter according to the present invention, since the synthetic resin upper plate is integrally molded with the upper filtering fabric constituting the filtering fabric bag and the inlet pipe is connected to the upper plate, there is no risk of the filtering fabric bag coming off the inlet pipe. Also, since the synthetic resin lower plate is integrally molded with the lower filtering fabric constituting the filtering fabric bag and the spring is fixed to the lower plate, the lower plate is pressed against a bottom surface of the fuel tank by the spring and there is no risk of the filtering fabric bag being worn out. Further, the spring is fixed between the upper and lower plates integrally provided to the upper and lower filtering fabrics, respectively, and the upper and lower filtering fabrics are connected with a specific positional relationship. Thus, when the peripheral portions of the upper and lower filtering fabrics are thermally bonded together to form the filtering fabric bag, lamination of the peripheral portions of the upper and lower filtering fabrics can be easily carried out accurately and positively, so that the filtering fabric bag can be easily and securely formed by bonding together the peripheral portions of the upper and lower filtering fabrics without making creases and lines thereon and with good productivity.

DETAILED DESCRIPTION OF THE PREFERRED EMBODIMENTS

Hereunder, with reference to the embodiments, the present invention will be explained more specifically.

Figure 1:
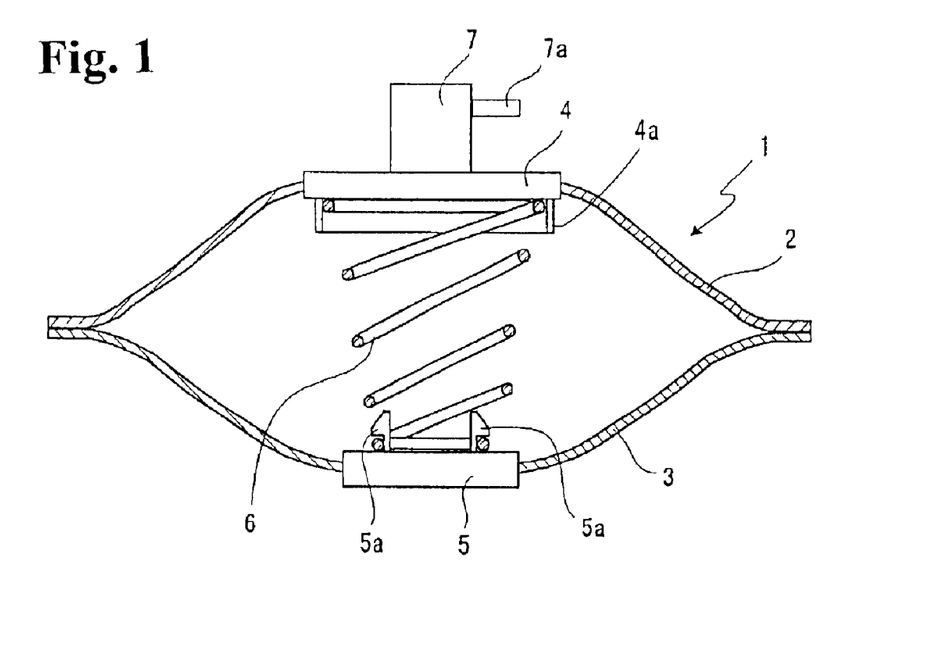
FIG. 1 is a sectional view showing a suction filter of the first embodiment according to the present invention.

FIG. 1 is a sectional view showing a suction filter of the first embodiment according to the present invention. The suction filter is attached to a lower end of a pump b disposed in a fuel tank a so that a lower end surface thereof contacts a bottom surface of the fuel tank a, as in a suction filter d shown in FIG. 5.

In FIG. 1, reference numeral 1 represents a filtering fabric bag, wherein the respective peripheral portions of an upper filtering fabric 2 and a lower filtering fabric 3 are thermally bonded together. An upper plate 4 and a lower plate 5 made of a synthetic resin are integrally molded with the filtering fabrics 2 and 3 at the central portions thereof, and a coil spring 6 is provided between the upper and lower plates 4, 5.

Both the upper and lower plates 4, 5 are integrally molded with the filtering fabrics 2, 3 by an insert molding method. The molding materials of the respective plates 4, 5 pass through the textures of the filtering fabrics 2, 3, so that the central portions of the upper and lower filtering fabrics 2, 3 are buried at the central portions in the thickness direction of the upper plate 4 and the lower plate 5, respectively. The lower surface of the lower plate 5 projects downward from the lower surface of the lower filtering fabric 3 (the lower surface of the filtering fabric bag 1). The projected lower surface of the lower plate 5 abuts against the bottom surface of the fuel tank.

A circular through-hole, not specially shown, passing through the filtering fabric bag 1 is formed at the center portion of the upper plate 4 integrally formed with the upper filtering fabric 2. A pipe portion 7 communicating with the circular through-hole is integrally provided on the upper surface of the upper plate 4, and the pipe portion 7 is fixed to an inlet pipe or pump in the fuel tank. Also, a spring fixing portion 4a in a ring-wall shape is integrally formed at the lower surface peripheral portion of the upper plate 4, and an upper tip portion of a coil spring 6 is fitted to the spring fixing portion 4a. Incidentally, in FIG. 1, 7a represents an attaching member integrally provided on an outer circumferential surface of the pipe portion 7, and a member projecting from the pump side is fitted into a hole, not shown, provided to the attaching member 7a, so that the filtering fabric bag 1 can be fixed to the pump.

Also, a plurality of hook-shape engaging claws 5a for fixing the spring projects from the upper surface of the lower plate 5, and a lower tip portion of the coil spring 6 is fitted to the hook-shape engaging claws 5a.

A suitable filtrating fabric can be used as the upper and lower filtering fabric according to a kind of fuel to be used, and there is no specific restriction. However, it is especially preferable to use a mesh or woven fabric made of a synthetic resin, which can be thermally bonded, such as nylon, polyethylene, polypropylene and polyacetal. Since it is sufficient that the suction filter can remove only solid impurities, the mesh fabric has a mesh in the order of 30 to 120 μm, preferably, 70 to 77 μm.

As a material for molding the upper and lower plates 4, 5 and a pipe portion 7, it is preferable to use an injection moldable thermoplastic resin, such as nylon, polyethylene, polypropylene and polyacetal.

The suction filer can be produced as follows. First, the upper and lower filtering fabrics 2, 3 are cut into a predetermined shape; the shaped fabrics are set in an injection molding machine; the upper plate 4 and the pipe portion 7 are integrally molded at the center of the upper filtering fabric 2 by an insert molding method and, in the same manner, the lower plate 5 is integrally molded at the center of the lower filtering fabric 3.

Next, the respective ends of the coil spring 6 are fixed to the spring fixing portions 4a, 5a of the upper and lower plates 4, 5 so that the upper and lower filtering fabrics 2, 3 are connected by the coil spring 6. Under the state, the peripheral portions of the upper and lower filtering fabrics 2, 3 are laminated together and set in a thermal bonding machine to thereby thermally bond and mold a filtering fabric bag 1.

As explained above, since the suction filter of the present embodiment is structured such that the synthetic resin upper plate 4 is integrally molded with the upper filtering fabric 2 for constituting the filtering fabric bag 1, and the suction pipe or pump in the fuel tank is connected to the pipe portion 7 of the upper plate 4, there is no risk that the filtering fabric bag 1 is separated from the suction pipe or pump. Also, since the synthetic resin lower plate 5 is integrally molded to the lower filtering fabric 3 for constituting the filtering fabric bag 1, and the lower tip portion of the coil spring 6 is fixed to the lower plate 5 so that the lower plate 5 is pressed against the bottom surface of the fuel tank by the coil spring 6, there is no possibility of the filtering fabric bag 1 being worn out.

Further, since the coil spring 6 is fixed between the upper and lower plates 4, 5 integrally provided to the respective upper and lower filtering fabrics 2, 3 so that the upper and lower filtering fabrics 2, 3 are connected to each other at their centers, when the peripheral portions of the upper and lower filtering fabrics 2, 3 are thermally bonded together to form the filtering fabric bag 1, the peripheral portions of the upper and lower filtering fabrics 2, 3 are securely, precisely and easily laminated. Thus, creases and poor bonding do not occur to thereby obtain the filtering fabric bag 1 with good productivity.

Figure 2:
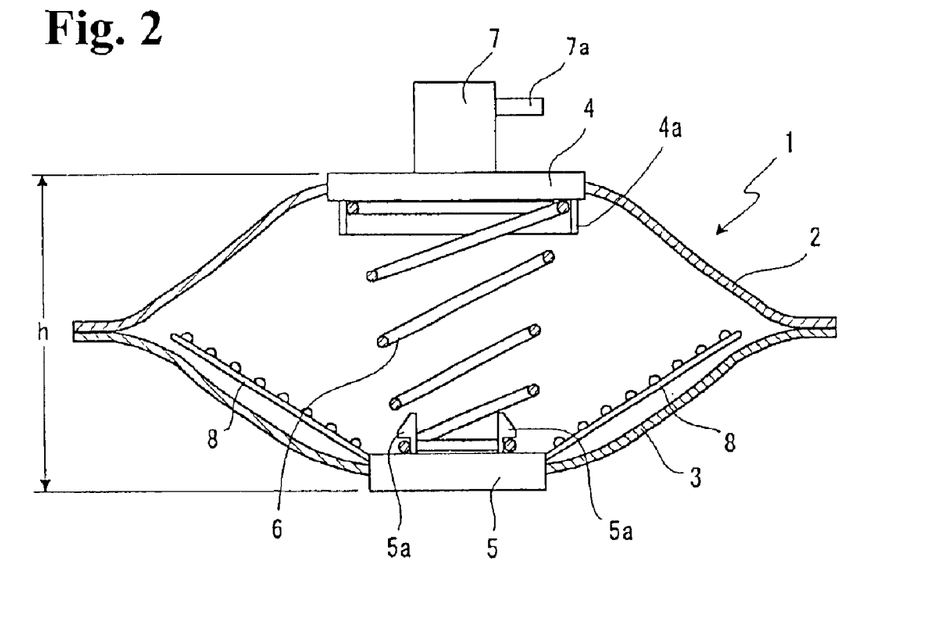
FIG. 2 is a sectional view showing a suction filter of the second embodiment according to the present invention.

FIG. 2 is a sectional view showing a suction filter of a second embodiment according to the present invention. The suction filter includes sticking prevention members 8 integrally projecting in the filtering fabric bag 1 from an inner peripheral portion of the lower plate 5.

The sticking prevention members 8 are vertically swingably attached at their base end portions, and a plurality of small projections is integrally provided on the upper surfaces thereof. Incidentally, although only the two sticking prevention members 8 are shown in FIG. 2, actually, three or more than four sticking prevention members 8 may be disposed radially around the lower plate 5.

According to the suction filter as shown in FIG. 2, the sticking prevention members 8 can positively prevent the upper and lower filtering fabrics 2, 3 from sticking to each other so that a suction pressure becomes higher. More specifically, when a height h of the filtering fabric bag 1 becomes low due to the installation state of the suction filter and the vertical movement of the pump, the upper and lower filtering fabrics 2, 3 stick to each other due to the suction pressure, so that the suction pressure abnormally increases and, according to circumstances, there may be a case wherein the fuel can not be sucked any more. However, according to the suction filter as shown in FIG. 2, the upper and lower filtering fabrics 2, 3 can be positively prevented from sticking to each other. Also, the suction pressure can be prevented from being increased due to sticking of the filtering fabrics, so that the fuel can be securely and positively sucked.

Incidentally, since the other structures, operations and effects are the same as those of the suction filter in the first embodiment, the same reference symbols as those of the first embodiment are assigned to the same constituting portions and the explanations thereof are omitted.

Figure 3:
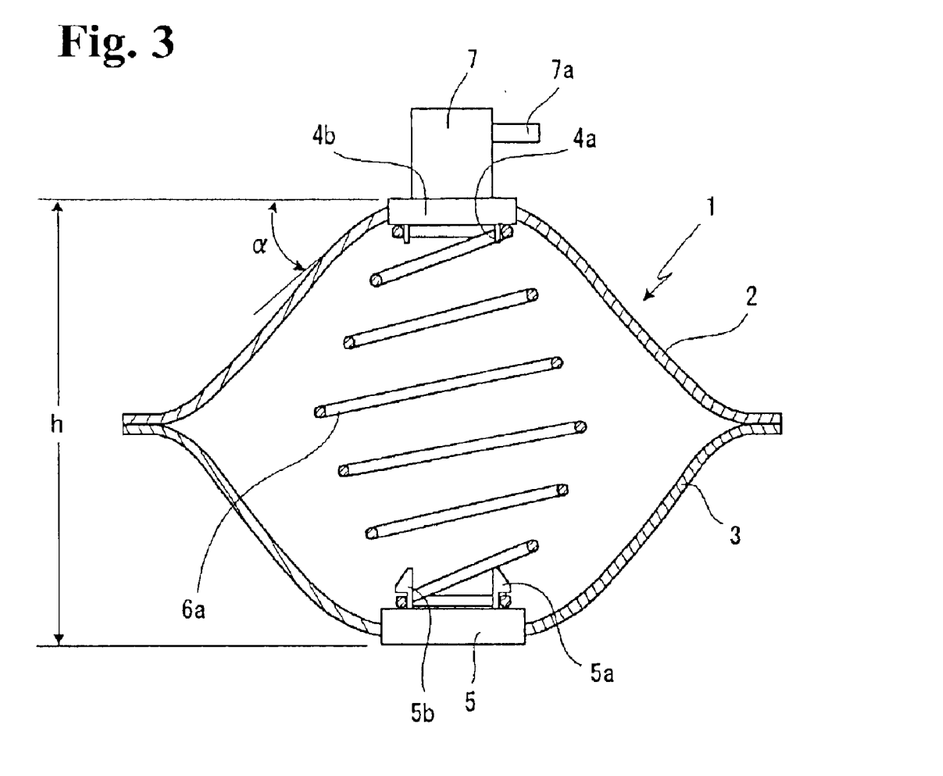
FIG. 3 is a sectional view showing a suction filter of the third embodiment according to the present invention.

FIG. 3 is a sectional view showing a suction filter of the third embodiment according to the present invention. The suction filter includes a coil spring 6a formed to be big at an intermediate portion in an axial direction and small at both end portions thereof, and upper and lower plates 4b, 5 formed to be relatively small.

According to the suction filter as shown in FIG. 3, since both end portions of the coil spring have relatively small diameters, the upper and lower plates 4b, 5 can also be formed relatively small (the upper plate 4b can be formed smaller than those of the first and second embodiments). Therefore, even in case the height h of the filtering fabric bag 1 is made larger, the filtering fabric bag 1 can be effectively prevented from being creased or lined, so that a suction filter having a good performance can be positively obtained.

More specifically, in case the height of the filtering fabric bag 1 is made large, the inclination angle α is inevitably large, so that when the peripheral portions of the upper and lower filtering fabrics 2, 3 are bonded together, the filtering fabrics are liable to be creased or lined. However, according to the suction filter of the present embodiment, since the upper and lower plates 4b, 5 can be formed relatively small, even if the height h of the filtering fabric bag 1 is made higher, the inclination angle α of the filtering fabric bag 1 can be made relatively small. Thus, the filtering fabric bag 1 having a large height h can be easily obtained without making any creases or lines to the filtering fabric.

Incidentally, since the other structures, operations and effects are the same as those of the suction filter in the first embodiment, the same reference symbols as those of the first embodiment are assigned to the same constituting portions and the explanations thereof are omitted.

As shown in the first to third embodiments, in the suction filter according to the present invention, the spring is fixed between the upper plate 4 (or 4b) and lower plate 5, and the filtering fabric bag 1 is held in an expanded state. In the first to third embodiments, the coil spring 6 (or 6a) is used and the upper and lower ends of the coil spring 6 (or 6a) slide in a state where they contact the upper plate 4 (or 4b) and lower plate 5 when the suction filter is moved or the coil spring 6 (or 6a) is expanded or contracted, so that the upper plate 4 (or 4b) and lower plate 5 are ground to thereby produce ground materials. Thus, there is a risk that the pump may be clogged with the ground materials. Therefore, it is preferable that both the tip portions of the coil spring 6 (or 6a) are fixed to the upper plate 4 (or 4b) and the lower plate 5, so that both tips of the coil spring 6 (or 6a) do not slide along the upper plate 4 (or 4b) and the lower plate 5, respectively.

Figure 6A:
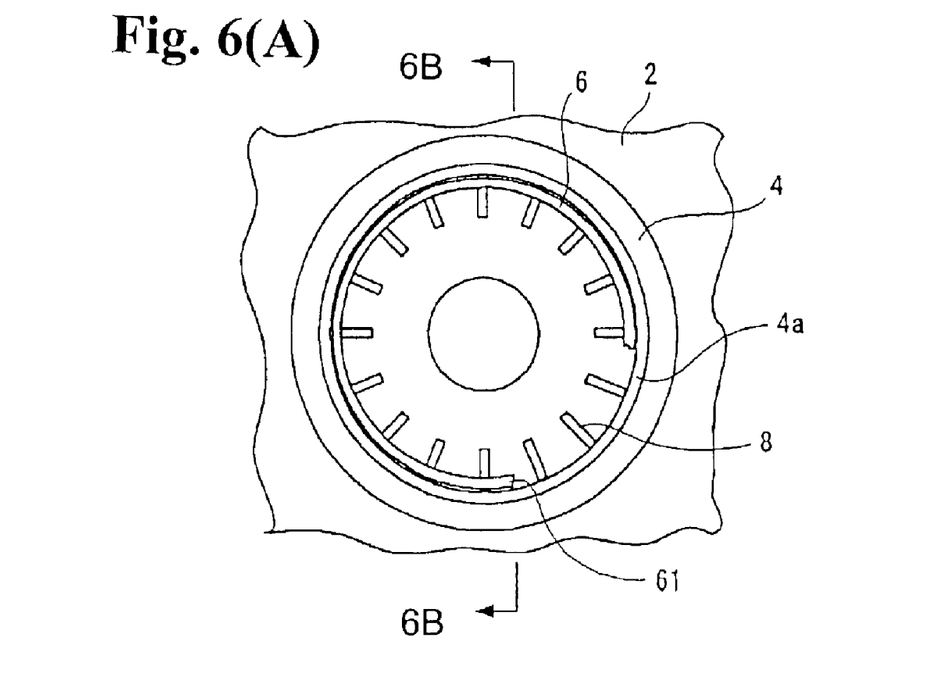
FIG. 6(A) is a plan view showing a device for preventing both tips of a coil spring from sliding along upper and lower plates.
Figure 6B:
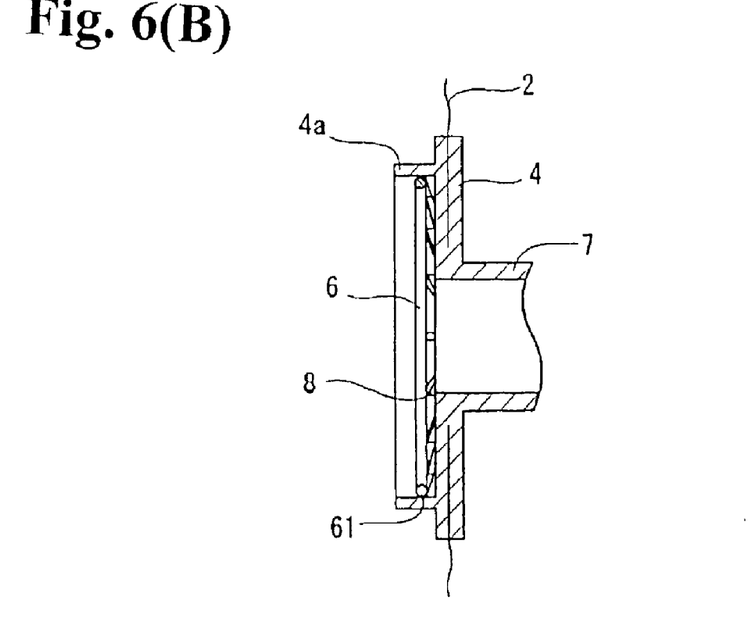
FIG. 6(B) is a sectional view taken along ling 6B—6B in FIG. 6(A)
Figure 7A:
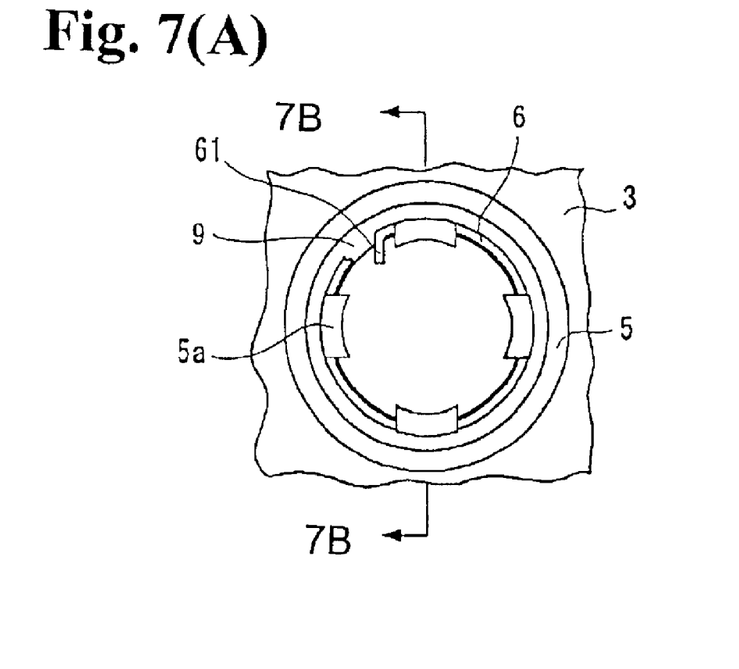
FIG. 7(A) is a plan view showing another device for preventing both tips of the coil spring from sliding along the upper and lower plates.
Figure 7B:
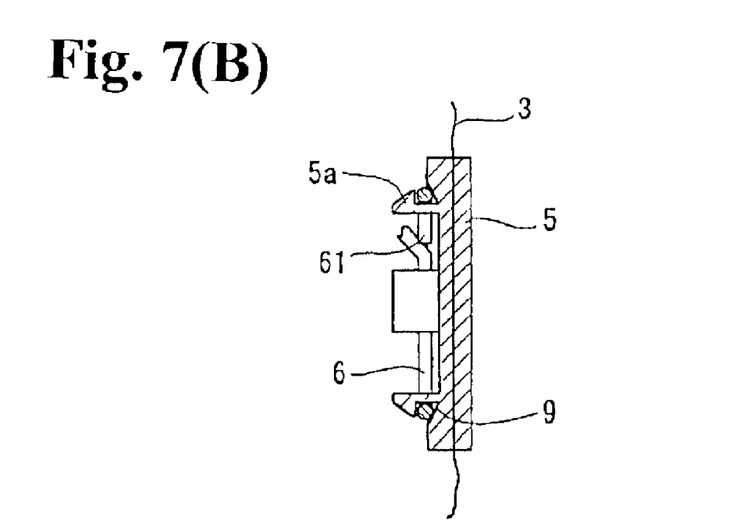
FIG. 7(B) is a sectional view taken along line 7B—7B in FIG. 7(A)

For example, as shown in FIGS. 6(A) and 6(B), a plurality of small projecting members 8 (16 in the drawing) having gradually lowering heights in a tapered state is radially disposed to a coil spring abutting portion of the upper plate 4. Then, the upper tip portion of the coil spring 6 is fixed in a state where the tip of the coil spring 6 abuts against the small projecting members 8, and the upper tip portion of the coil spring 6 is fixed to the upper plate 4 so that the tip 61 of the coil spring 6 does not contact the upper plate 4. Also, as shown in FIGS. 7(A) and 7(B), a tapered surface 9 in an inwardly inclined cone-shape is formed to the coil spring abutting portion of the lower plate 5, and the tip 61 of the coil spring 6 is bent inward. Thus, the lower tip portion of the coil spring 6 can be fixed to the lower plate 5 so that the tip 61 of the coil spring 6 does not contact the lower plate 5. Therefore, it is possible to prevent the upper and lower plates 4, 5 from being ground by the tips 61 in the upper and lower tip portions of the coil spring 6 as little as possible. Thus, the production of the ground material is positively prevented.

Figure 8A:
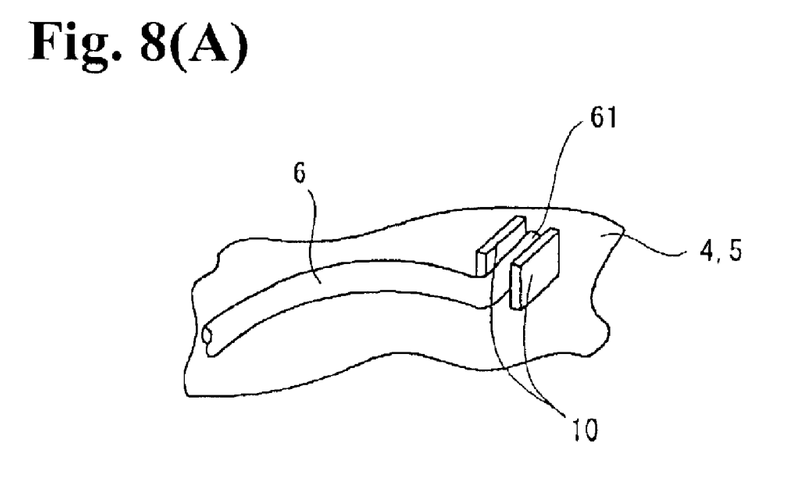
FIG. 8(A) is a schematic perspective view showing a device for preventing both tips of the coil spring from sliding along the upper and lower plates.
Figure 8B:
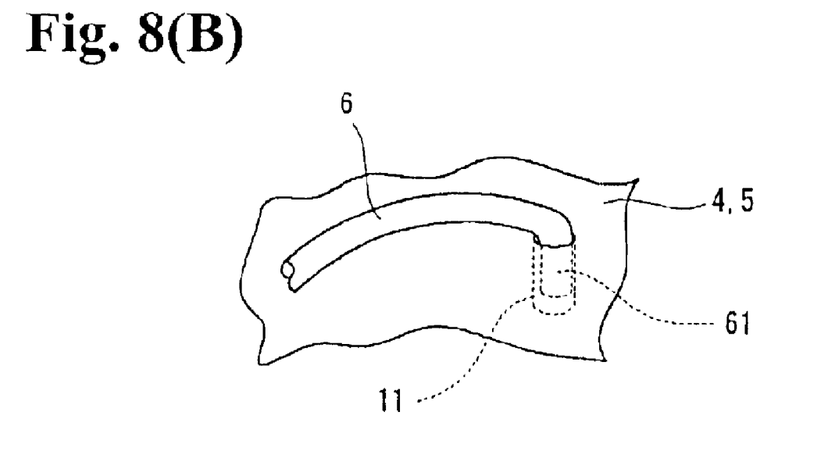
FIG. 8(B) is a schematic perspective view showing another device for preventing both tips of the coil spring from sliding along the upper and lower plates.

In this case, the tapered surface 9 as shown in FIG. 7(A) may be provided to the upper plate 4, and the small projecting members 8 as shown in FIG. 6(A) may be provided to the lower plate 5. Or, other methods may be employed to prevent the tips 61 of the coil spring 6 from being slid along the upper and lower plates 4, 5. As the other methods, as shown in FIG. 8(A), a fitting portion defined by a pair of holding members 10 may be provided on each of the upper and lower plates 4, 5, so that the tip 61 of the coil spring 6 is engaged between the holding members 10; and as shown in FIG. 8(B), a fitting portion defined by an engaging hole 11 is provided on each of the upper and lower plates 4, 5, and both tips 61 of the spring coil 6 may be engaged with the engaging holes 11, respectively. Or, there may be employed a method structured such that the tips 61 of the coil spring 6 do not slide along the upper and lower plates 4, 5 by fixing the tip portions of the coil spring 6 to the plates 4, 5, respectively.

Incidentally, the suction filter according to the present invention is not limited to the above-stated embodiments, and can be properly changed. For example, in the above embodiments, the upper plate 4 (or 4b) and lower plate 5 are provided at the centers of the upper and lower filtering fabrics, respectively. However, according to circumstances, a suction filter may be formed such that the upper plate 4 (or 4b) and lower plate 5 are provided at specific positions other than the centers of the upper and lower filtering fabrics, so that the upper and lower plates 4 (or 4b), 5 and the coil spring 6 (or 6a) are disposed at eccentric positions of the filtering fabric bag 1.

Also, in the above-described embodiments, although the upper and lower filtering fabrics 2, 3 are explained to be separate sheets, they may be formed by folding back a sheet of the filtering fabric. For example, the upper and lower plates are formed in one sheet of the filtering fabric, the filtering fabric is folded back in half, and a spring is attached between the upper and lower plates. Then, the laminated peripheral portions thereof are bonded together to obtain a filtering fabric bag. Further, other structures may also be changed unless they depart from the subject matter of the present invention.

As described hereinabove, according to the suction filter of the present invention, there is no such possibility that the filtering fabric bag is worn out and creases and poor bonding do not occur, so that a good reliability can be obtained. Also, the peripheral portions of the upper and lower filtering fabrics can be bonded positively and easily to thereby obtain the filtering fabric bag with good productivity.

While the invention has been explained with reference to the specific embodiments of the invention, the explanation is illustrative and the invention is limited only by the appended claims.

What is claimed is:

1. A suction filter to be attached to a fuel inlet pipe disposed in a fuel tank, comprising:

an upper filtering fabric having an upper peripheral portion;

a lower filtering fabric having a lower peripheral portion, said upper and lower peripheral portions being bonded together to form a filtering fabric bag;

a spring provided in the filtering fabric bag to prevent the filtering fabric bag from being crushed to become flat and having two end portions;

a synthetic resin upper plate to be connected to the fuel inlet pipe, said synthetic resin upper plate being integrally molded with the upper filtering fabric; and a synthetic resin lower plate integrally molded with the lower filtering fabric, said lower plate having an upper projecting portion partly projecting from an upper surface of the lower filtering fabric inside the filtering fabric bag and a lower projecting portion partly projecting from a lower surface of the lower filtering fabric so that the lower projecting portion abuts against an inner wall surface of the fuel tank, said two end portions of the spring being fixed to the upper and lower plates, respectively.

2. A suction filter as claimed in claim 1, wherein said upper plate and upper filtering fabric, and said lower plate and lower filtering fabric are integrated by an insertion molding, respectively.

3. A suction filter as claimed in claim 1, wherein said upper and lower plates include spring fixing portions, respectively, said two end portions of said spring being fixed to said spring fixing portions, respectively.

4. A suction filter as claimed in claim 3, wherein one of said spring fixing portions has a hook shape for holding corresponding one of the two end portions of the spring.

5. A suction filter as claimed in claim 1, wherein said lower plate includes sticking prevention members projecting outwardly from the lower plate inside the filtering fabric bag to prevent the upper and lower filtering fabrics from being stuck to each other.

6. A suction filter as claimed in claim 1, wherein said spring has an intermediate portion between the two end portions thereof in an axial direction, said intermediate portion being greater in a lateral size than those of the two end portions, said upper and lower plates having sizes substantially the same as those of the two end portions.

7. A suction filter as claimed in claim 1, wherein said spring is a coil spring, two end portions of said coil spring being fixed to the upper plate and lower plate, respectively, so that the two end portions of the coil spring do not slide along the upper and lower plates.

8. A suction filter as claimed in claim 7, further comprising a coil spring abutting portion formed in at least one of said upper and lower plates, said coil spring abutting portion having a plurality of projecting members gradually lowered in height in a tapered shape toward a center thereof, at least one of said end portions of said coil spring abutting against the projecting members so that a tip portion of the coil spring does not directly contact the plate with the projecting members.

9. A suction filter as claimed in claim 7, further comprising a coil spring abutting portion formed in at least one of said upper and lower plates, said coil spring abutting portion having a ring-shape tapered surface inclined inward in a cone shape, at least one of the end portions of the coil spring on the ring-shape tapered surface being folded back inward so that the at least one of the end portions of the coil spring does not contact the plate with the tapered surface.

10. A suction filter as claimed in claim 7, further comprising a fitting portion fitting with one of tip portions of the coil spring and provided on at least one of the upper and lower plates, said tip portion of the coil spring being fixed to said fitting portion so that the tip portion of the coil spring does not slide along the plate attached thereto.

11. A suction filter as claimed in claim 1, wherein said upper and lower filtering fabrics are integrally connected together at respective ends thereof.

* * * * *